United States Patent
Cooper et al.

(10) Patent No.: US 10,692,444 B2
(45) Date of Patent: Jun. 23, 2020

(54) SYSTEMS AND METHODS FOR CONTROLLING OPERATION OF A BACKLIGHT FOR A DISPLAY PANEL

(71) Applicant: Bose Corporation, Framingham, MA (US)

(72) Inventors: Jonathan Cooper, Newport, RI (US); Bruno Gauthier, Goffstown, NH (US); Trevor Lai, Wayland, MA (US)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 16/140,446

(22) Filed: Sep. 24, 2018

(65) Prior Publication Data

US 2020/0098321 A1  Mar. 26, 2020

(51) Int. Cl.
*G09G 3/34* (2006.01)
*G02F 1/13357* (2006.01)
*G06F 1/16* (2006.01)

(52) U.S. Cl.
CPC ..... *G09G 3/3406* (2013.01); *G02F 1/133602* (2013.01); *G06F 1/1605* (2013.01); *G09G 2320/0626* (2013.01)

(58) Field of Classification Search
CPC ........... G09G 3/3406; G02F 1/133602; G06F 1/1605
See application file for complete search history.

(56) References Cited

U.S. PATENT DOCUMENTS

| 2009/0152445 A1* | 6/2009 | Gardner, Jr. ......... G09G 3/3406 250/214 AL |
| 2011/0156898 A1* | 6/2011 | Taillefer ................... G08B 1/08 340/539.11 |
| 2013/0093797 A1* | 4/2013 | Guo ..................... G09G 3/3426 345/690 |

FOREIGN PATENT DOCUMENTS

| EP | 2214154 | 8/2010 |
| JP | 2002108796 | 4/2002 |
| JP | 2010175913 | 8/2010 |
| JP | 2013142869 | 7/2013 |
| JP | 2014160170 | 9/2014 |
| JP | 2018092261 | 6/2018 |

OTHER PUBLICATIONS

Notice of Reasons for Rejection; Office Action Issued in Counterpart Application; Japanese Patent Application No. 2019-3355, pp. 1-9, dated Dec. 9, 2019.

* cited by examiner

*Primary Examiner* — Alexander Eisen
*Assistant Examiner* — Cory A Almeida
(74) *Attorney, Agent, or Firm* — Bond, Schoeneck & King, PLLC

(57) ABSTRACT

An electronic device, a display control system, and a method for controlling operation of a display unit of an electronic device. The method includes generating a display signal by a display controller. The display signal is interpreted by the display unit to display a content of the display signal on a display panel of the display unit. The content of the display signal is compared to a known data pattern. The display unit is operated in accordance to an operating parameter corresponding to the known data pattern if the known data pattern is detected in the display signal.

15 Claims, 2 Drawing Sheets

SYSTEMS AND METHODS FOR CONTROLLING OPERATION OF A BACKLIGHT FOR A DISPLAY PANEL

BACKGROUND

The disclosure relates to display units for electronic devices and related devices and methods, and, particularly, to display units having backlit display panels.

SUMMARY

All examples and features mentioned below can be combined in any technically possible way.

In one aspect, a method of controlling operation of a display unit of an electronic device is provided. The method includes generating a display signal by a display controller; interpreting the display signal by the display unit to display a content of the display signal on a display panel of the display unit; comparing the content of the display signal to a known data pattern; and operating the display unit in accordance to an operating parameter corresponding to the known data pattern if the known data pattern is detected in the display signal.

In one example, the display signal comprises data pertaining to a plurality of individual frames for the content, and the comparing comprises comparing one or more the frames to the known data pattern. In one example, the operating occurs only if a preset number of the frames in successive order contain the known data pattern. In one example, the operating ceases for portions of the display signal in which the known data pattern is not detected.

In one example, the operating parameter relates to a brightness level of a backlight configured to illuminate the display panel. In one example, the known data pattern corresponds to an entirely blank or black display. In one example, operating the display unit in accordance to the operating parameter includes turning the backlight off upon detection of the known data pattern. In one example, the known data pattern comprises an array of all zeros. In one example, operating the display unit in accordance to the operating parameter includes turning the backlight on for portions of the display signal in which the display signal contains any non-zero values.

In one example, the operating comprises increasing the brightness level of the backlight for portions of the display signal in which the known data pattern is detected. In one example, the comparing is performed by the display controller and the operating is performed by a product controller. In one example, detection logic of the display controller performs the comparing, the method further comprising communicating results of the comparing to the product controller. In one example, the communicating comprises modifying a system file of an operating system and reading the system file by the product controller, the system file comprising instructions pertaining to the operating parameter.

In one aspect, a display unit is provided. The display unit includes a display panel configured to interpret a display signal received by the display unit from a display controller, and to display a content of the display signal; and a backlight configured to emit light through the display panel and to operate at a brightness level corresponding to a known data pattern if the known data pattern is detected in the content.

In another aspect, an electronic display control system is provided. The control system includes a display controller configured to generate a display signal; a display unit comprising a display panel and a backlight, the display unit configured to interpret the display signal and to display a content of the display signal on the display panel; detection logic configured to compare the display signal to a known data pattern; and a product controller configured to control operation of the backlight in accordance with an operating parameter corresponding to the known data pattern if the known data pattern is detected by the detection logic in the display signal.

In one example, the known data pattern corresponds to the content being displayed as blank, nothing, or all black. In one example, the product controller is configured to turn the backlight off for portions of the display signal in which the known data pattern is detected. In one example, the display panel is a liquid crystal display panel.

In one aspect, an electronic device is provided that includes a control system according to the examples disclosed herein. In one example, the electronic device comprises a stereo or loudspeaker system.

DETAILED DESCRIPTION

The present disclosure describes various systems and methods for controlling operation of a display unit of an electronic device, and more particularly to operating a backlight for a display panel if a known data pattern is detected in the content of a display signal sent to the display unit.

Many electronic devices, such as a speaker system or other audio equipment, include display panels for visually communicating information to a user. For example, a wirelessly controlled speaker system may include a display panel that enables the speaker system to display information obtained from the internet, e.g., websites, graphics, images, text, metadata pertaining to streaming or playing audio files, etc. Certain display panel types, such as liquid crystal displays (LCDs) may benefit from backlighting, in which a backlight assembly is provided to emit light through the LCD panel since LCD panels do not provide their own illumination.

For electronic devices with backlit display panels, it may be desirable to turn the backlight off when the electronic device is not being used and/or use of the display panel is not desired. For example, when the electronic device is used in low-ambient light conditions the light emitted by a backlight may be undesirable to some users even if set to a relatively low brightness level with the display panel displaying a blank or all black screen.

One possibility includes turning on and off the backlight depending on whether the electronic device is in a network standby mode, e.g., in which a connection to the internet or other network is disabled, since there is no web-based information to display when in this mode. However, turning the backlight off during network standby may also disable a user from viewing other non-network related information, such as a volume bar graphic or menu when a user attempts to adjust volume or other setting of the electronic device. Additionally, operating the backlight only when in a network standby mode would not enable power consumption to be reduced when the display panel is not needed in other modes.

As described herein, an electronic device is configured with detection logic that compares a display signal to the display unit to one or more known data patterns. For example, the known data pattern could consist of an array of all zeros, or other pattern that corresponds to the display panel being instructed to display nothing (e.g., a blank or all black screen). When the known data pattern is detected, then operating parameters of the display unit can be set accordingly. For example, the backlight can be turned off when it is detected that the display signal is instructing the display panel to display a blank or all black screen, and/or to be turned on when this pattern is not detected.

Figure 1:
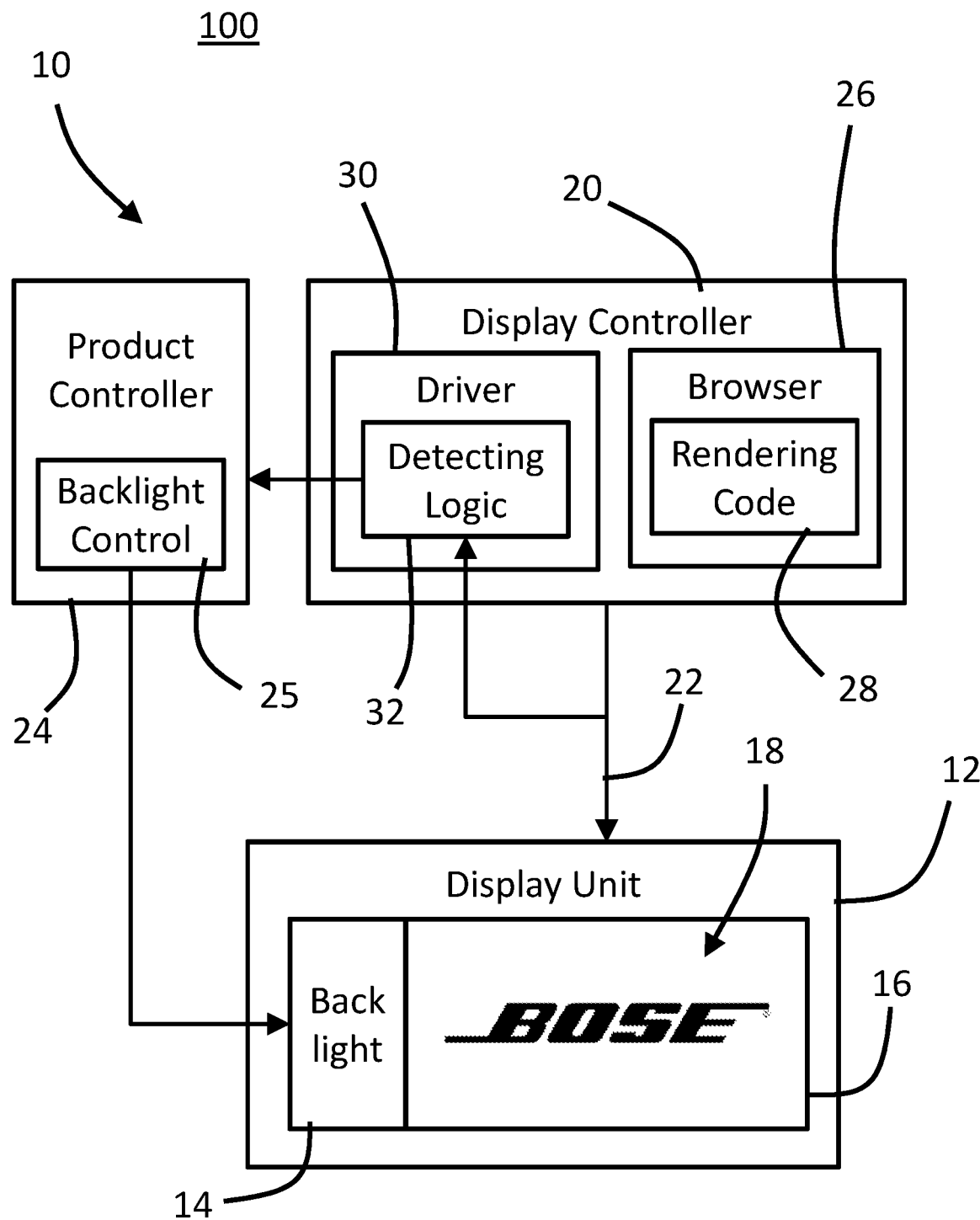
FIG. 1 is a block diagram of display and control components for an electronic device according to one example disclosed herein.

FIG. 1 depicts a control system 10 for an electronic device 100 having a display unit 12. For example, the electronic device 100 may be a stereo, a toy, a children's monitor, an appliance, or any other device that includes an embedded, integrated, or attached electronic monitor, screen, or other display.

The display unit 12 may be a monitor or screen utilizing any technology that benefits from illumination by a backlight 14. For example, the display unit 12 may include a display panel 16, e.g., a liquid crystal display (LCD) panel, arranged in conjunction with the backlight 14. The backlight 14 may include one or more light sources, such as light emitting diodes (LEDs), configured to illuminate the display panel 16 (e.g., to direct light through the panel 16 from behind).

The display panel 16 may be configured to depict graphical content 18 in the form of text, images, colors, graphics, shapes, symbols, or other electronically generated and/or displayed indicia. The display panel 16 may have any desired pixel resolution, refresh rate, or other parameters defining the operation of the display panel 16. In the illustrated example, the content 18 is shown as a corporate logo, but it is to be understood that this is merely one example and any other content may be depicted. Those of ordinary skill in the art will recognize other technologies, types, and arrangements of backlit displays that can be used for the display unit 12 than that shown.

The content 18 to be depicted on the display panel may be determined, set, and/or managed by a display controller 20. That is, the display controller 20 may comprise various hardware and software components that together create a display signal 22 that can be received by the display unit 12 and interpreted by the display unit 12 to generate the content 18 based on the display signal 22. For example, the display signal 22 may be an array of values that the display unit 12 utilizes to instruct the pixels of the display panel 16 to operate at certain colors for depicting the content 18 as instructed by the display controller 20.

The control system 10 may also include a product controller 24 for controlling the functions, features, and/or operation of various components of the electronic device 100, including the backlight 14. For example, the product controller 24 may include a backlight control 25 arranged to turn the backlight 14 on and off, and/or to set a brightness setting for the backlight 14 (e.g., set an intensity of the light sources of the backlight 14 to a value between 0% and 100%). For example, if it is desired to simply enable the backlight 14 to be turned on and off, then the backlight control 25 may include a switching device, such as an electronic relay, metal-oxide-semiconductor field-effect transistor (MOSFET), or other switch. Transducers or other components may be included to provide a variable output if a larger degree of control of the brightness level is desired. In one example, the product controller 24 is in communication with a light sensor that adjusts the brightness of the backlight 14 automatically in response to the ambient light level. In one example, the product controller 24 is in communication with a communication module (e.g., either directly or indirectly via an operating system), such as an antenna, radio, transceiver, etc. such that a level for the backlight is automatically adjusted when the electronic device 100 enters a network standby mode.

The product controller 24 may also control operation of electro-acoustic transducers, actuators, sensors, or other hardware components of the electronic device 100, as applicable. The product controller 24 may be in communication with a user interface, such as a graphical user interface (managed via the operating system), or a physical button, knob, switch, etc., to facilitate user control over hardware components via the product controller 24. For example, a user interface may enable a user to set the brightness level for the backlight 14.

It is to be appreciated that the control system 10 is illustrated in FIG. 1 with a high level of abstraction to facilitate discussion of various features and components herein and should not be considered limiting. For example, the display controller 20, the product controller 24, etc. may be any collection of software and/or hardware configured to enable the functionality and features described herein. While illustrated as separate entities, certain computational resources and components (e.g., memory, processor, wired or wireless communication modules, etc.) may be shared by or between the display controller 20 and the product controller 24, each may have designated resources, or there may be a combination of shared and designated resources. The display controller 20 and product controller 24 may also share, include, or be incorporated as a part of the same software components, such as an operating system (e.g., Linux) or firmware for the electronic device 100.

In the illustrated example, the display controller 20 may include a browser application 26 arranged to facilitate retrieval of remote data (e.g., via a wired or wireless data connection to the internet or other remote network location) for display on the display unit 12. The browser application 26 may be a Web Platform for Embedded (WPE) browser. The browser 26 may include rendering code 28, such as Hypertext Markup Language (HTML) 5, JavaScript, or any other language, standard, protocol, or technology to assist in rendering the retrieved data to create the display signal 22. In this way, the retrieved data can be converted into a form that enables the content 18 to be displayed on the panel 16 in a desired form or manner, e.g., as a website, user interface, graphics, tables, etc. The display controller 20 may also include a display driver 30 arranged to enable an operating system of the electronic device 100 to communicate properly with display-related hardware components, such as the display unit 12, a graphics card or graphics processing unit (GPU), etc.

The control system 10 may include detection logic 32 configured to retrieve the display signal 22 and analyze each frame for the content 18 defined by the display signal 22 for one or more preset data patterns. If a preset data pattern is detected in the display signal 22, then this information may be relayed to the product controller 24, which operates the backlight control 25 to set a mode of operation of the backlight 14 that corresponds to the detected pattern. That is, any given layout for the content 18 will be represented by a unique data pattern in the display signal 22. For example, referring specifically to the example for the content 18 in FIG. 1, the data of the display signal 22 will take a particular form in order to instruct production of the BOSE® logo, as shown. Upon detection of a data pattern in the display signal 22 indicating that the content 18 is to produce a specific graphic, word, image, etc., such as the illustrated logo, the backlight 14 may be controlled in a desired manner, e.g., brightly illuminated the display panel 16 to enhance visibility the content 18, dimmed to reduce power consumption, etc.

As another example, an instruction to render the content 18 as a completely blank or black screen may be implemented as an array of all zeros for the display signal 22. If a blank or black screen is instructed to be displayed, then the product controller 24 may be configured to completely turn off, or substantially dim, the backlight 14 upon the detection logic 32 recognizing the corresponding pattern (e.g., an array of all zeros). Advantageously, in this way, the power usage of the display unit 12 can be reduced by only turning the backlight 14 on when the display signal 22 indicates something other than a blank or black screen as the content 18. Additionally, this avoids a situation in which (particularly under low ambient light conditions), the light from the backlight 14 is visible despite nothing being displayed by the display panel 16, which may be aesthetically and functionally undesirable to users.

In this way, the detection logic 32 can look at designated frames (e.g., every frame) that are being rendered to determine one or more operational parameters for the display unit 12 (e.g., whether the backlight 14 should be turned on or off). If the current frame (or current set of frames) is some known pattern (e.g., all zeroes, which indicates entirely black content, nothing, or a blank screen) then operation of the display unit 12 can commence in accordance with the parameters corresponding to the detected pattern (e.g., the backlight 14 can be disabled).

The detection logic 32 may sit one layer below the browser application 26, e.g., as part of the driver 30 as shown. In one example, the detection logic 32 may be included by another component, such as the product controller 24, the display unit 12, etc. In one example, the display driver 30 is a Linux display driver that is configured to modify a system file (e.g., expose a/sysfs/interface) upon detection of the known pattern, which the product controller 24 reads to determine operation of the backlight 14 (or other component of the display unit 12).

Figure 2:
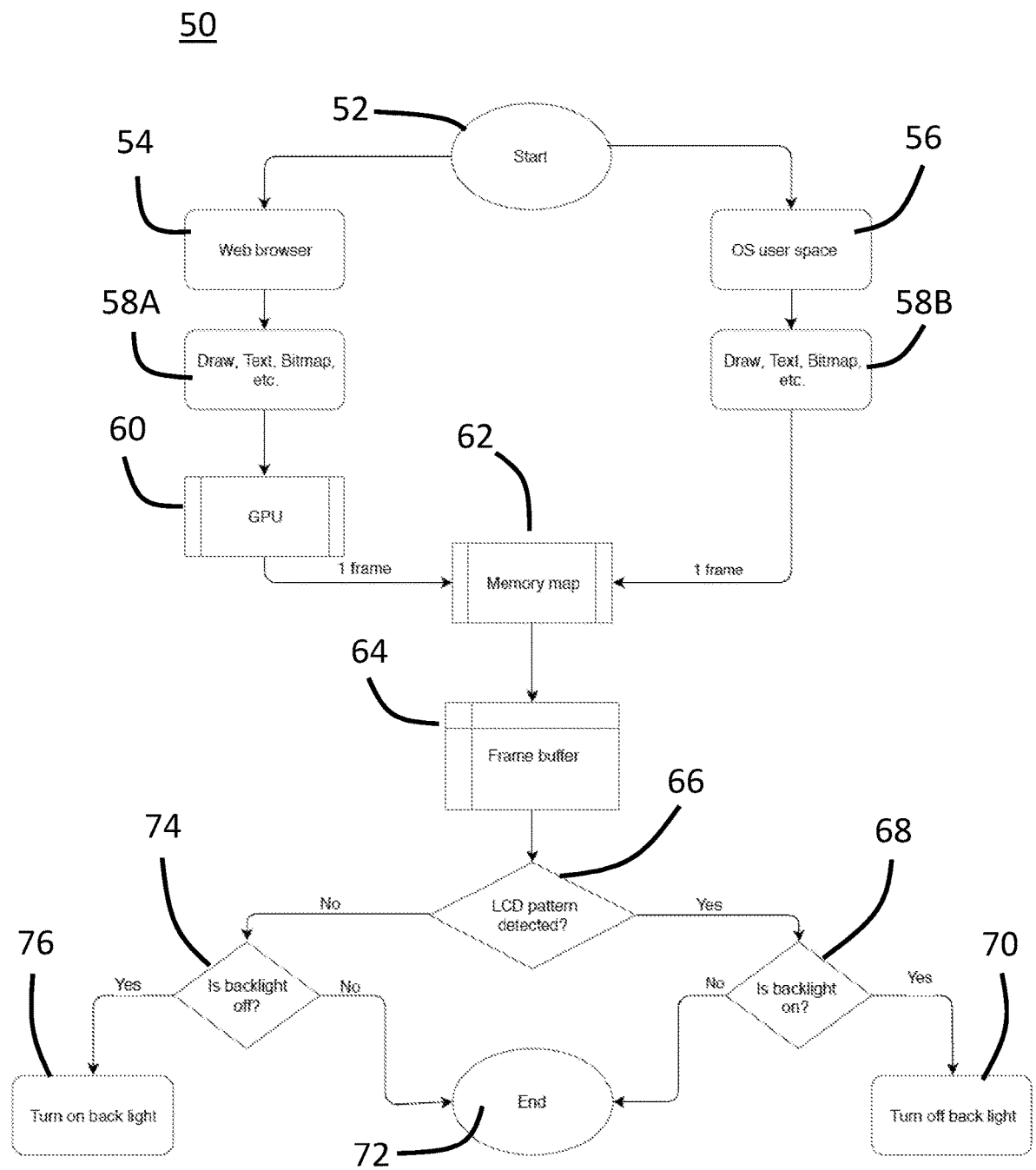
FIG. 2 is a flowchart illustrating a method for controlling a display of an electronic device according to one example disclosed herein.

FIG. 2 illustrates a flowchart describing a method 50 for operating a control system (e.g., the control system 10) according to one example. The method 50 starts at step 52 in which display data and/or a request or instruction to display certain content is retrieved by one or more components of the control system. In this example, at step 54 the data is retrieved by a web browser (e.g., the browser application 26), while at step 56 the data is retrieved from a user and/or operating system. For example, the step 54 may include retrieving data over the internet for displaying a website or the like. The step 56 may include receiving a user input via a user interface (e.g., graphical or physical), via a sensor (such as an ambient light sensor), etc., as discussed above.

The steps 54 and 56 proceed to steps 58A and 58B, respectively, in which the display signal (e.g., the signal 22) for rendering the desired content (e.g., the content 18) is generated (e.g., by the display controller 20). If applicable, the step 58A may proceed additional rendering by a graphics processing unit (GPU) at step 60. For example, as noted above, content at step 58A for a web browser may include a website layout or other information obtained from the internet. In a device, such as a loudspeaker, including one or more electro-acoustic transducers, the content in step 58B may include system functions, such as a graphical representation of a volume of the electro-acoustic transducers (e.g., a volume bar, graph, or number indicating the current volume level) that appears when a user adjusts volume. As another example, the content in step 58B may include a countdown before the electric device turns off, a manufacturer brand name or logo for the electronic device, a representation of the current time monitored by an embedded clock of the electronic device, a representative of a current status or operating mode of the electronic device, etc.

In either case, the display signal can be processed one frame at a time to construct a memory map for each frame at step 62. As discussed above, the memory can be compared to the one or more known patterns, e.g., stored in memory. Frame buffering may be implemented at step 64 to facilitate continuous processing each frame, or a number of frames, in a stream of display data. At step 66 it is determined (e.g., via the detection logic 32) whether a current frame matches the known pattern (or one of the known patterns if more than one known pattern is stored). It is to be appreciated that instead of a single frame, multiple successive frames could be compared to the known pattern(s) and a corresponding action only triggered if the known pattern is present for a selected number of successive frames.

With respect to the method 50, the known pattern corresponds to a blank or black screen (e.g., an array of all zeros, as discussed above), although it is to be appreciated that any other known patterns could be utilized at that this is merely one example. Accordingly, if step 66 indicates that the current frame matches the known pattern (corresponding to a blank or all black content), the method 50 may proceed to step 68 in which it is determined whether the backlight (e.g., the backlight 14) is already turned on. If the backlight is currently on, then it can be turned off at step 70 (e.g., to reduce the total power consumption when nothing is being requested for display, i.e., when the content of the display is blank). Of course, as noted above, any other operation may be performed on the backlight (as opposed to turning it off) corresponding to whichever known pattern is detected (e.g., dimming, brightening, setting a specified brightness level, etc.). If the backlight is already turned off, then step 68 may end at step 72. It is to be appreciated that the step 72 may be an end for a single cycle for the method 50, which causes the method to be repeated at an earlier step for one or more subsequent cycles, with respect to one or more subsequent frames of display data.

Returning to step 66, if the memory map for the current frame (or frames) does not match the known pattern (or patterns), then the method 50 may proceed to step 74. At step 74 it is determined whether the backlight is currently off. If the backlight is off, then it can be turned on at step 76, or the method (or cycle thereof) can end at step 72 as discussed above. In this way, as soon as anything gets rendered that results in a non-zero value in the display signal, it is ensured that the backlight is turned on. As discussed above, the herein described analysis of the content of a display signal can be extended to any known pattern (other than all zeros) to result in any corresponding action of a display unit.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A method of controlling operation of a display unit of an electronic device, comprising:
    generating a graphical display signal by a display controller;
    interpreting the graphical display signal by the display unit to display a content of the graphical display signal on a display panel of the display unit;
    comparing the content of the graphical display signal to a known graphical data pattern wherein the known graphical data pattern comprises data entailing a specific graphic, word, or image; and
    operating the display unit in accordance to an operating parameter corresponding to the known graphical data pattern if the known graphical data pattern is detected in the display signal while the electronic device is in a network standby mode;
    wherein operating the display unit according to an operating parameter includes turning on a backlight of the display unit, turning off the backlight of the display unit, or adjusting a brightness level of the backlight of the display unit.

2. The method of claim 1, wherein the graphical display signal comprises data pertaining to a plurality of individual frames for the content, and the comparing comprises comparing one or more the frames to the known graphical data pattern.

3. The method of claim 2, wherein the operating occurs only if a preset number of the frames in successive order contain the known graphical data pattern.

4. The method of claim 1, wherein the operating ceases for portions of the graphical display signal in which the known graphical data pattern is not detected.

5. The method of claim 1, wherein operating the display unit in accordance to the operating parameter comprises turning the backlight on for portions of the display signal in which the graphical display signal contains any non-zero values.

6. The method of claim 1, wherein the operating comprises increasing the brightness level of the backlight for portions of the graphical display signal in which the known graphical data pattern is detected.

7. The method of claim 1, wherein the comparing is performed by the display controller and the operating is performed by a product controller.

8. The method of claim 7, wherein detection logic of the display controller performs the comparing, the method further comprising communicating results of the comparing to the product controller.

9. The method of claim 8, wherein the communicating comprises modifying a system file of an operating system and reading the system file by the product controller, the system file comprising instructions pertaining to the operating parameter.

10. A display unit, comprising:
    a display panel configured to interpret a graphical display signal received by the display unit from a display controller, and to display a content of the display signal across the entire display panel; and
    a backlight configured to emit light through the display panel and to operate at a brightness level corresponding to a known graphical data pattern if the known graphical data pattern is detected in the content of the entire display panel while the electronic device is in a network standby mode and wherein the known graphical data pattern comprises data entailing a specific graphic, word, or image.

11. An electronic display control system, comprising:
    a display controller configured to generate a graphical display signal;
    a display unit comprising a display panel and a backlight, the display unit configured to interpret the graphical display signal and to display a content of the graphical display signal on the display panel;
    detection logic configured to compare the graphical display signal to a known graphical data pattern wherein the known graphical data pattern comprises data entailing a specific graphic, word, or image; and
    a product controller configured to control operation of the backlight in accordance with an operating parameter corresponding to the known graphical data pattern if the known graphical data pattern is detected by the detection logic in the graphical display signal while the electronic device is in a network standby mode;
    wherein operation of the backlight in accordance with the operating parameter includes turning on the backlight, turning off the backlight, or adjusting a brightness level of the backlight.

12. The electronic display control system of claim 11, wherein the product controller is configured to turn the backlight off for portions of the graphical display signal in which the known graphical data pattern is detected.

13. The electronic display control system of claim 11, wherein the display panel is a liquid crystal display panel.

14. An electronic device comprising the control system of claim 11.

15. The electronic device of claim 14, wherein the electronic device comprises a stereo or loudspeaker system.

* * * * *